United States Patent
Lee

(10) Patent No.: US 8,395,349 B2
(45) Date of Patent: Mar. 12, 2013

(54) MOBILE TERMINAL AND METHOD FOR NOTIFYING CHARGING STATE WHEN CHARGED BY SOLAR CELL

(75) Inventor: Gi Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/830,110

(22) Filed: Jul. 2, 2010

(65) Prior Publication Data

US 2011/0148343 A1 Jun. 23, 2011

(30) Foreign Application Priority Data

Dec. 23, 2009 (KR) ........................ 10-2009-0129510

(51) Int. Cl.
*H01M 10/44* (2006.01)
*H01M 10/46* (2006.01)

(52) U.S. Cl. ..................................... 320/101

(58) Field of Classification Search .................. 320/101, 320/112, 114, 115, 128, 135
See application file for complete search history.

(56) References Cited

U.S. PATENT DOCUMENTS

| 7,251,509 B1* | 7/2007 | Wang ............................. 455/574 |
| 2009/0138133 A1 | 5/2009 | Buchholz et al. |
| 2010/0013309 A1* | 1/2010 | Rosenblatt et al. ........... 320/101 |
| 2011/0151943 A1* | 6/2011 | Lee ................................ 455/573 |

FOREIGN PATENT DOCUMENTS

| JP | 10-293825 A | 11/1998 |
| JP | 2004-64885 A | 2/2004 |
| KR | 10-2009-0043890 A | 5/2009 |

* cited by examiner

*Primary Examiner* — Edward Tso
(74) *Attorney, Agent, or Firm* — Birch, Stewart, Kolasch & Birch, LLP

(57) ABSTRACT

A mobile terminal includes a power supply including a solar cell; a controller which determines whether charging of power to the power supply can be performed using only the solar cell, controls charging of the power to the power supply using the solar cell when it is determined that the charging of the power can be performed using only the solar cell, and calculates an anticipated charged power amount and an anticipated charging time to reach a certain charging state of the power supply using a power charging speed of the solar cell; and an output unit which outputs charging state notification information that indicates at least one of the calculated anticipated charged power amount and the anticipated charging time, under control of the controller.

15 Claims, 15 Drawing Sheets

FIG. 4A

| Anticipated charging time | 3 hours | 2 hours | 1 hour | 0 |
|---|---|---|---|---|
| Anticipated charged power amount | 90% | 60% | 30% | 0% |
| Level | 1 | 2 | 3 | 4 |

(a)

(b)

(a)

| Level | 1 | 2 | 3 | 4 |
|---|---|---|---|---|
| Color | Red | Orange | Green | Blue |

(b)

(a)

(b)

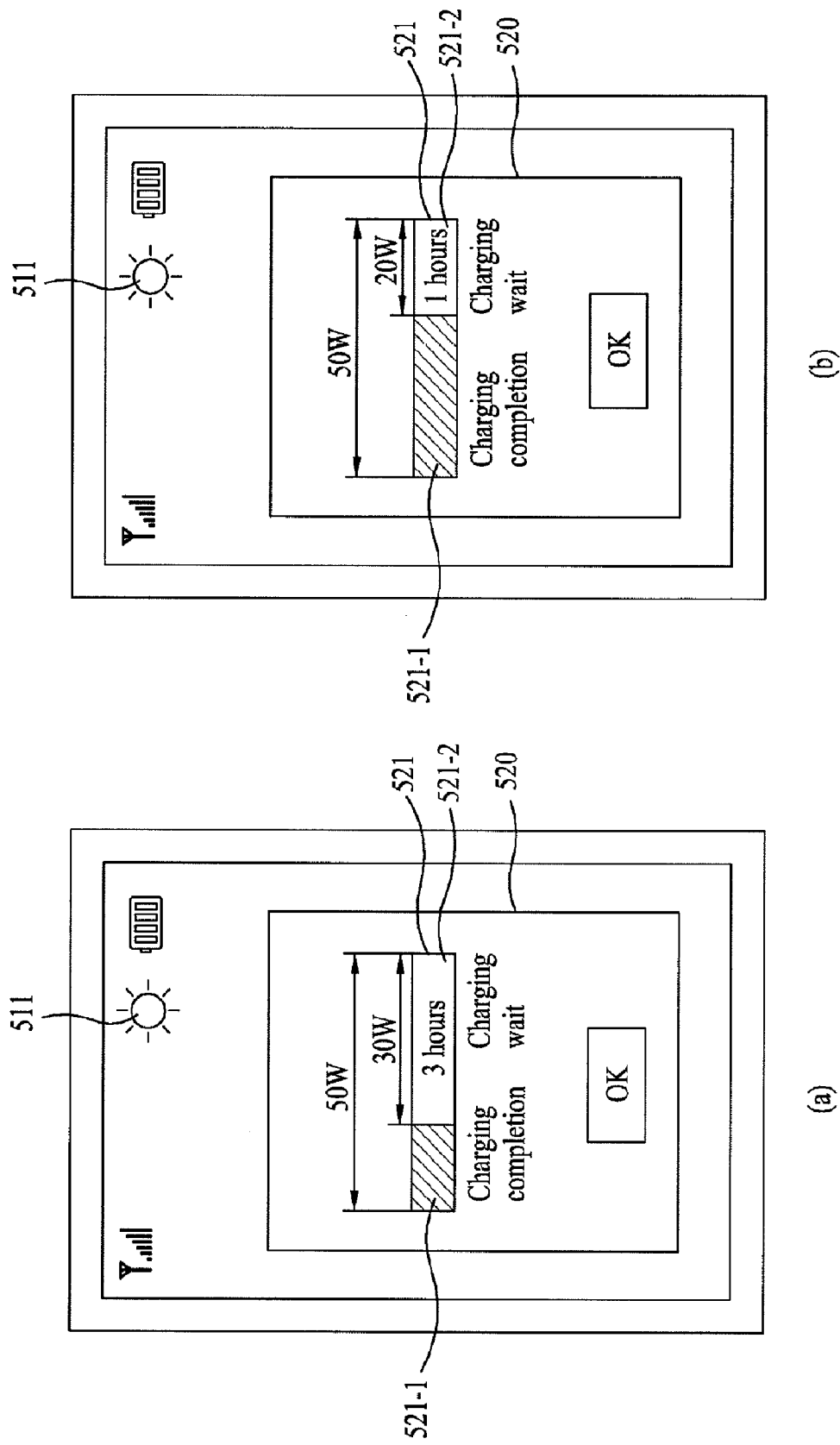

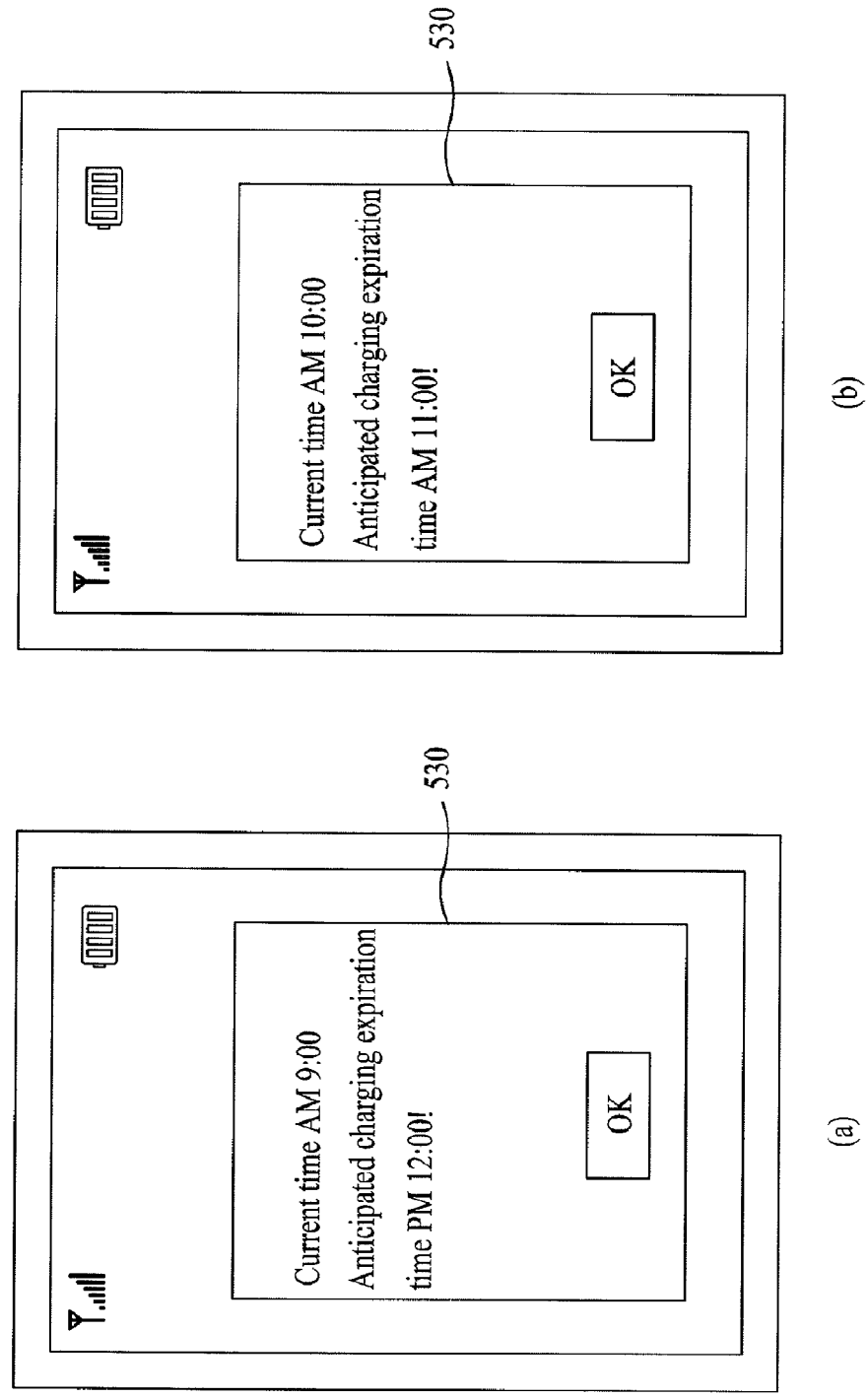

(a)

(b)

(a)

(b)

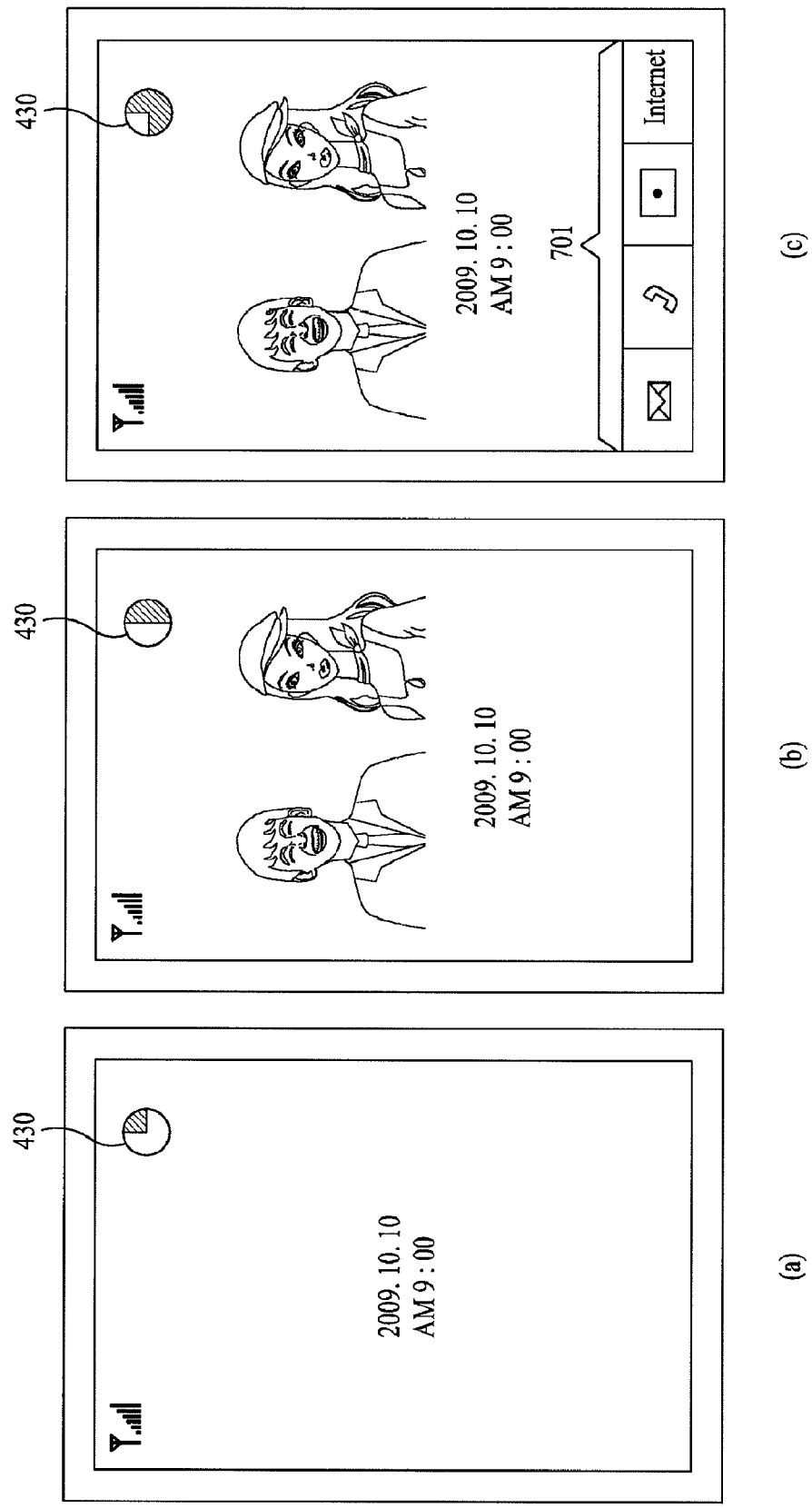

MOBILE TERMINAL AND METHOD FOR NOTIFYING CHARGING STATE WHEN CHARGED BY SOLAR CELL

This application claims priority to and the benefit of Korean Patent Application No. 10-2009-0129510 filed on Dec. 23, 2009, which is hereby incorporated by reference as if fully set forth herein.

BACKGROUND OF THE INVENTION

1. Field of the Invention

Embodiments of the invention relate to a mobile terminal which is capable of providing charging state information when power is charged by a solar cell, and a method for notifying a charging state thereof.

2. Discussion of the Related Art

Terminals may be classified into mobile/portable terminals and stationary terminals according to whether they are movable. Mobile terminals may also be classified into handheld terminals and vehicle mount terminals according to whether they can be directly carried by users.

As the functionality of such terminals is diversified, the terminals have been implemented in the form of a multimedia player having complex functions including, for example, photographing or video capturing functions, music or video file playback functions, game play function, and broadcast reception function.

In order to support and increase the functionality of such terminals, consideration to improve hardware parts and/or software parts of the terminal may be made.

A conventional mobile terminal may include a plurality of power sources including a solar cell, and may be able to notify a user of a level of a current remaining power amount using a power icon on a background of a screen.

However, in the above-mentioned conventional mobile terminal, in a situation in which power is charged with only the solar cell, there is no charging state notification information provided that takes account of a characteristic of the power being charged by the solar cell.

Moreover, there is no information about an anticipated charged power amount and an anticipated charging time up to a certain charging state provided that takes account of a charging situation up to a current time.

SUMMARY OF THE INVENTION

Accordingly, embodiments of the invention are directed to a mobile terminal and a method for notifying a charging state thereof that substantially obviate one or more problems due to limitations and disadvantages of the related art.

An object of the invention is to provide a mobile terminal which is capable of, in a situation in which charging is performed with only the solar cell, providing information about an anticipated charged power amount and an anticipated charging time up to a certain charging state that takes account of a characteristic of the charging being performed by the solar cell, and a method for notifying a charging state thereof.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal, includes a power supply comprising including a solar cell; a controller for which determining determines whether charging of power to the power supply can be performed using only the solar cell, controls charging of the power to the power supply using the solar cell when it is determined that the charging of the power can be performed using only the solar cell, and calculating calculates an anticipated charged power amount and an anticipated charging time up to reach a certain charging state of the power supply using a power charging speed of the solar cell; and an output unit for which outputting outputs charging state notification information comprising that indicates at least one of the calculated anticipated charged power amount and the anticipated charging time, under control of the controller.

In another aspect of the invention, a method for notifying a charging state of a mobile terminal, includes determining whether charging of power to a power supply can be performed using only a solar cell; charging the power to the power supply using the solar cell when it is determined that the charging of the power can be performed using only the solar cell; calculating an anticipated charged power amount and an anticipated charging time up toto reach a certain charging state of the power supply using a power charging speed of the solar cell; and outputting charging state notification information comprising that indicates at least one of the calculated anticipated charged power amount and the anticipated charging time.

In another aspect of the present invention, a mobile terminal includes a power supply including a solar cell; a controller which determines whether charging of the power supply can be performed to a certain charging state that is less than a full charging of the power supply using only the solar cell, controls charging of the power to the power supply using the solar cell when it is determined that the charging of the power can be performed using only the solar cell, and calculates an anticipated charged power amount and an anticipated charging time to reach the certain charging state of the power supply using a power charging speed of the solar cell; and an output unit which outputs charging state notification information that indicates at least one of the calculated anticipated charged power amount and the anticipated charging time, under control of the controller.

It is to be understood that both the foregoing general description and the following detailed description of embodiments of the invention are examples and explanatory, and are intended to provide further explanation of the embodiments of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A to FIG. 4D are screen diagrams illustrating outputs of charging state notification information by charging levels according to the invention;

FIG. 5A to FIG. 5C are screen diagrams illustrating outputs of an anticipated charged power amount and an anticipated charging time according to the invention;

FIG. 7A and FIG. 7B are screen diagrams illustrating the control of the operation of a display unit based on the anticipated charged power amount and anticipated charging time according to the invention.

DETAILED DESCRIPTION OF THE INVENTION

Reference will now be made in detail to the embodiments of the invention, examples of which are illustrated in the accompanying drawings. Wherever possible, the same reference numbers will be used throughout the drawings to refer to the same or like parts. It is to be noted that the suffixes of constituent elements used in the following description, such as "module" and "unit", are simply used by considering the ease of writing this specification, but are not particularly given importance and roles. Accordingly, the terminologies "module" and "unit" can be used interchangeably.

A mobile terminal described in this specification may include, for example, a mobile phone, a smart phone, a laptop computer, a digital broadcasting terminal, a personal digital assistant (PDA), a portable multimedia player (PMP), and a navigator.

However, it will be readily understood by those skilled in the art that configurations according to embodiments described in this specification may also be applied to stationary terminals such as a digital television (TV) and a desktop computer as well.

Figure 1:
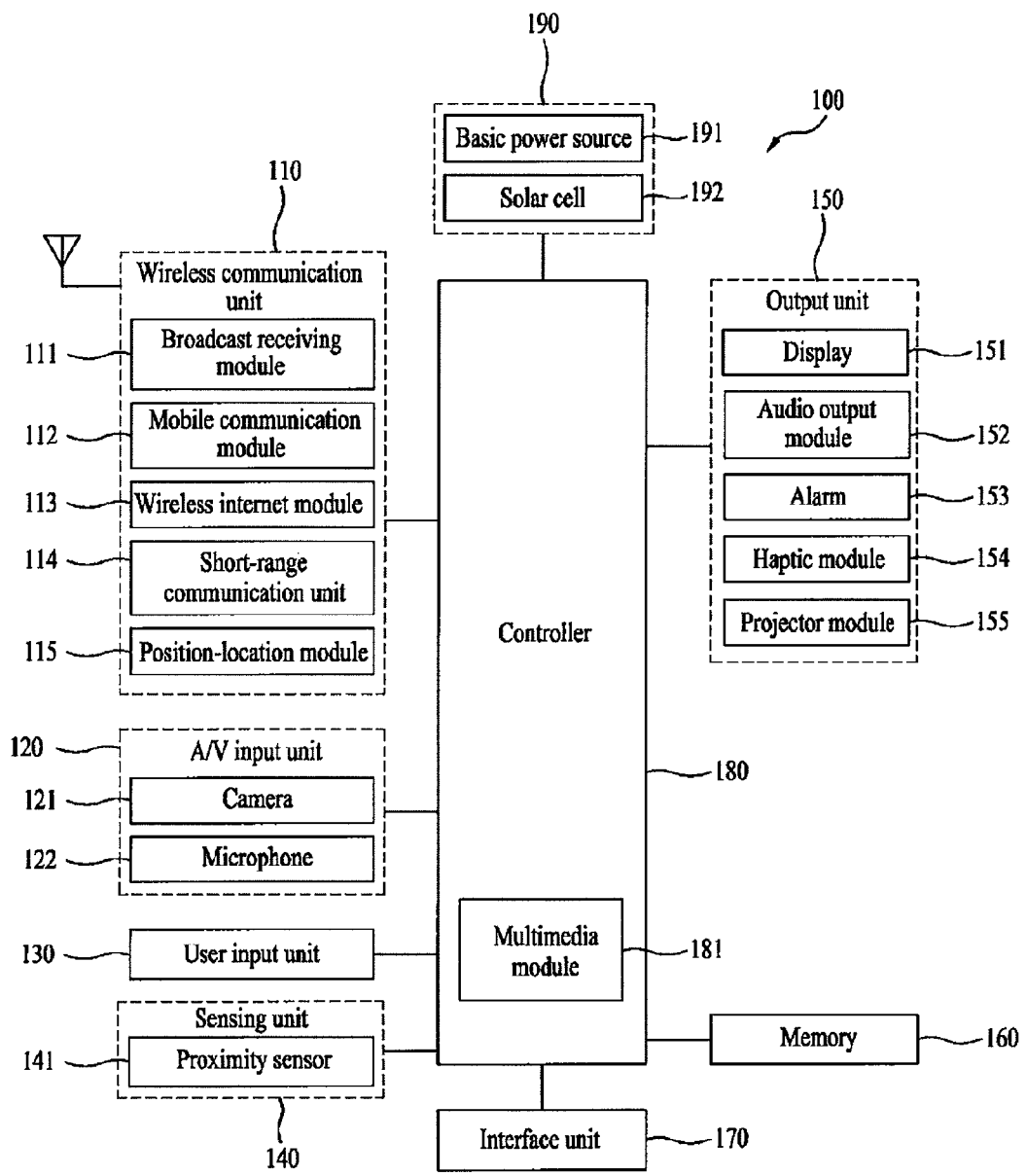
FIG. 1 is a block diagram of a mobile terminal according to an embodiment of the invention.

FIG. 1 is a block diagram of a mobile terminal according to an embodiment of the invention.

The mobile terminal, denoted by reference numeral 100, includes a wireless communication unit 110, an audio/video (A/V) input unit 120, a user input unit 130, a sensing unit 140, an output unit 150, a memory 160, an interface unit 170, a controller 180, and a power supply 190. The components shown in FIG. 1 are not indispensable, but it will be understood that a mobile terminal having a larger or smaller number of components may alternatively be implemented.

Hereinafter, the above components will be described in order.

The wireless communication unit 110 includes one or more modules for enabling wireless communication between the mobile terminal 100 and a wireless communication system or between the mobile terminal 100 and a network where the mobile terminal 100 is located. For example, the wireless communication unit 110 may include a broadcast receiving module 111, a mobile communication module 112, a wireless Internet module 113, a short-range communication module (unit) 114, and a position location module 115.

The broadcast receiving module 111 receives a broadcast signal and/or broadcast associated information from an external broadcast management server over a broadcast channel.

The broadcast channel may include a satellite channel and a terrestrial channel. The broadcast management server may signify a server that generates and transmits a broadcast signal and/or broadcast associated information or a server that receives a broadcast signal and/or broadcast associated information, previously generated, and transmits the same to a terminal (or a mobile terminal). The broadcast signal may include a TV broadcast signal, a radio broadcast signal, and a data broadcast signal. The broadcast signal may also include a broadcast signal in the form of a combination of a TV broadcast signal or radio broadcast signal with a data broadcast signal.

The broadcast associated information may signify information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, the broadcast associated information may exist in the form of an electronic program guide (EPG) of digital multimedia broadcasting (DMB) or an electronic service guide (ESG) of digital video broadcast-handheld (DVB-H).

The broadcast receiving module ill may receive a digital broadcast signal using a digital broadcasting system such as digital multimedia broadcasting-terrestrial (DMB-T), digital multimedia broadcasting-satellite (DMB-S), media forward link only (MediaFLO), digital video broadcast-handheld (DVB-H) or integrated services digital broadcast-terrestrial (ISDB-T). It is also to be understood that the broadcast receiving module 111 may be configured to be suitable for other broadcasting systems as well as the above-mentioned digital broadcasting systems.

The broadcast signal and/or broadcast associated information received via the broadcast receiving module 111 may be stored in the memory 160.

The mobile communication module 112 transmits/receives radio signals to/from at least one of a base station, an external terminal and a server over a mobile communication network. The radio signals may include a voice call signal, a video telephony call signal or various forms of data based on text/multimedia message transmission/reception.

The wireless Internet module 113 refers to a module for wireless Internet access. This module may be internally or externally coupled to the mobile terminal 100. For example, wireless Internet technologies may include wireless LAN (WLAN) (Wi-Fi), wireless broadband (WiBro), world interoperability for microwave access (Wimax), and high speed downlink packet access (HSDPA).

The short-range communication module 114 refers to a module for short-range communications. For example, short-range communication technologies may include Bluetooth, radio frequency identification (RFID), infrared data association (IrDA), ultra wideband (UWB), and ZigBee.

The position location module 115 is a module for acquiring the location of the mobile terminal 100. A representative example of the position location module 115 may be a global positioning system (GPS) module.

Further referring to FIG. 1, the A/V input unit 120 is configured to input an audio signal or video signal. The A/V input unit 120 may include a camera 121 and a microphone 122. The camera 121 processes frames of a still image or moving image acquired by an image sensor in a video call mode or image capture mode. The processed image frames may be displayed on a display unit 151.

The image frames processed by the camera 121 may be stored in the memory 160 or externally transmitted via the wireless communication unit 110. Two or more cameras 121 may be provided depending on the use environment of a terminal (or a mobile terminal).

The microphone 122 receives an external sound signal in a call mode, a recording mode, a voice recognition mode, or the like and processes the received sound signal to convert it into electrical audio data. In the call mode, the converted audio data may be converted into that of a format transmittable to a mobile communication base station through the mobile communication module 112 and then outputted to the mobile communication base station. Various noise removal algorithms may be implemented in the microphone 122 to remove noise generated in the course of receiving the external sound signal.

The user input unit 130 generates input data for control of the operation of the terminal by the user. The user input unit 130 may include a key pad, a dome switch, a touch pad (static pressure/capacitance), a jog wheel, and a jog switch.

The sensing unit 140 senses the current state of the mobile terminal 100, such as the open/closed state of the mobile terminal 100, the location of the mobile terminal 100, the presence or absence of user contact with the mobile terminal 100, the orientation of the mobile terminal 100 or the acceleration/deceleration of the mobile terminal 100, and generates a sense signal for control of the operation of the mobile terminal 100 as a result of the sensing. For example, when the mobile terminal 100 is a slide type mobile phone, the sensing unit 140 may sense whether the slide phone is open or closed. In addition, the sensing unit 140 may sense whether the power supply 190 supplies power or whether the interface unit 170 is coupled with an external device. On the other hand, the sensing unit 140 may include a proximity sensor 141.

The output unit 150 is configured to generate outputs associated with the sense of sight, the sense of hearing, tactile sense, and so on. To this end, the output unit 150 may include the display unit 151, an audio output module 152, an alarm unit 153, a haptic module 154, and a projector module 155.

The display unit 151 displays (outputs) information processed in the mobile terminal 100. For example, when the mobile terminal 100 is in the call mode, the display unit 151 may display a user interface (UI) or graphic user interface (GUI) associated with a call. When the mobile terminal 100 is in the video call mode or image capture mode, the display unit 151 may display a captured and/or received image, a UI or a GUI.

The display unit 151 may include at least one of a liquid crystal display (LCD), a thin film transistor-liquid crystal display (TFT-LCD), an organic light-emitting diode display (OLED), a flexible display and a three-dimensional (3D) display.

Some of the above-mentioned displays may be configured in a transparent type or a light transmission type so that the outside can be seen therethrough. This may be called a transparent display. A representative example of the transparent display may be a transparent OLED (TOLED). The rear structure of the display unit 151 may also be of the light transmission type. This structure enables the user to see objects located in the rear of the body of the terminal through an area of the terminal body occupied by the display unit 151.

The mobile terminal 100 may include two or more display units 151 according to its desired implementation. For example, a plurality of display units may be arranged separately or integrally on one surface of the mobile terminal 100 or arranged on different surfaces of the mobile terminal 100, respectively.

When the display unit 151 and a sensor for sensing a touch operation (referred to hereinafter as a 'touch sensor') constitute a layered structure (referred to hereinafter as a 'touch screen'), the display unit 151 may also be used as an input device as well as an output device. The touch sensor may be implemented in the form of, for example, a touch film, a touch sheet or a touch pad.

The touch sensor may be configured to convert a change in pressure applied to a specific portion of the display unit 151 or electrostatic capacitance generated at a specific portion of the display unit 151 into an electrical input signal. The touch sensor may be configured to sense a pressure at the time of touch as well as a position and area touched.

When a touch input is received by the touch sensor, a corresponding signal(s) is sent to a touch controller. The touch controller processes the signal(s) and then transmits corresponding data to the controller 180. Thus, the controller 180 can determine which area of the display unit 151 has been touched.

Also referring to FIG. 1, the proximity sensor 141 may be positioned in an internal area of the mobile terminal 100, surrounded by the touch screen, or near the touch screen. The proximity sensor 141 refers to a sensor for sensing objects approaching a specific detection surface of the touch screen or objects present in the proximity of the touch screen without a mechanical contact by employing an electromagnetic force or infrared rays. The proximity sensor 141 has a longer lifespan than that of a contact type sensor and a higher degree of utilization than that of the contact type sensor.

Hereinafter, for convenience of description, a behavior in which a pointer comes close to the touch screen without touching the touch screen and, therefore, the pointer is recognized as if it is positioned on the touch screen will be referred to as a "proximity touch", and a behavior in which a pointer actually touches the touch screen will be referred to as a "contact touch". A proximity touch position of the pointer on the touch screen signifies a position where the pointer vertically corresponds to the touch screen when the proximity touch of the pointer is conducted.

The proximity sensor 141 is configured to sense a proximity touch operation and a proximity touch pattern (including, for example, a proximity touch distance, a proximity touch direction, a proximity touch speed, a proximity touch time, a proximity touch position, and a proximity touch moving state). Information corresponding to the sensed proximity touch operation and proximity touch pattern may be outputted on the touch screen.

The audio output module 152 may output audio data received from the wireless communication unit 110 or stored in the memory 160 in a call signal reception mode, a call mode, a recording mode, a voice recognition mode, a broadcast reception mode, or the like. The audio output module 152 may also output sound signals related to particular functions (for example, a call signal reception sound, a message reception sound, etc.) performed by the mobile terminal 100. This audio output module 152 may include a receiver, a speaker, and a buzzer.

The alarm unit (alarm) 153 outputs a signal to notify the user of occurrence of an event in the mobile terminal 100. The event occurring in the mobile terminal 100 may be, for example, call signal reception, message reception, key signal input or touch input. The alarm unit 153 may also output a signal in any form other than a video signal or audio signal, for example, in the form of a vibration to notify the user of occurrence of an event in the mobile terminal 100. The video signal or audio signal may also be outputted through the display unit 151 or audio output module 152. As a result, the display unit 151 and audio output module 152 may be classified as a part of the alarm unit 153.

The haptic module 154 generates a variety of haptic effects which can be felt by the user. A representative example of the haptic effects generated by the haptic module 154 may be a vibration effect. The strength, pattern, etc. of a vibration generated by the haptic module 154 are controllable. For example, different vibrations may be combined and outputted or sequentially outputted.

The haptic module 154 may generate, in addition to the vibration effect, various haptic effects, for example, an effect by a stimulus of an arrangement of pins moving vertically to a contact skin surface, an effect by a stimulus of an air injection force or suction force through an injection nozzle or inlet, an effect by a stimulus of grazing over the skin surface, an effect by a stimulus of an electrode contact, an effect by a stimulus of an electrostatic force, and an effect by reappearance of a feeling of cold and warmth employing an element that may absorb or generate heat.

The projector module 155 is a constituent element for performing an image project function using the mobile terminal 100. This projector module 155 may display the same image as that displayed on the display unit 151 or an image at least partially different from the image displayed on the display unit 151 on an external screen or wall in response to a control signal from the controller 180.

In detail, the projector module 155 may include a light source for generating a beam of light (for example, a laser beam) to output an image externally, image generation means for generating the image to be externally outputted using the light beam generated by the light source, and a lens for magnifying and outputting the image externally at a certain focusing distance. Also, the projector module 155 may include a device for mechanically moving the lens or the entire module to adjust an image projection direction.

The memory 160 may store programs for the processing and control of the controller 180 and may also function to temporarily store input/output data (for example, a phonebook, messages, audios, still images, and moving images). Also, the memory 160 may store a frequency of use of each of the aforementioned data (for example, frequencies of uses of each telephone number, each message and each multimedia) together with the aforementioned data. Further, the memory 160 may store data regarding various patterns of vibrations and sounds outputted at the time of touch input on the touch screen.

The memory 160 may include at least one type of storage media including a flash memory type, a hard disk type, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may also operate in association with a Web storage that performs the storage function of the memory 160 on the Internet.

The interface unit 170 acts as a passage between the mobile terminal 100 and all external devices connected to the mobile terminal 100. The interface unit 170 is configured to receive data or power from the external devices and transfer the received data or power to each internal component of the mobile terminal 100 or transmit internal data of the mobile terminal 100 to the external devices. For example, a wired/wireless headset port, an external charger port, a wired/wireless data port, a memory card port, a port for connection of a device equipped with an identification module, an audio input/output (I/O) port, a video I/O port, and an earphone port may be included in the interface unit 170.

The identification module is a chip that stores a variety of information to authenticate use authority of the mobile terminal 100, and may include a user identify module (UIM), a subscriber identity module (SIM), and a universal subscriber identify module (USIM). The device equipped with the identification module (referred to hereinafter as an 'identification device') may be made in the form of a smart card. Therefore, the identification device may be connected to the terminal 100 through a port.

The interface unit 170 may be a passage through which power from an external cradle is supplied to the mobile terminal 100 when the mobile terminal 100 is connected with the cradle or a passage through which a variety of command signals inputted from the cradle by the user are transferred to the mobile terminal 100. The variety of command signals or power inputted from the cradle may act as signals for recognition that the mobile terminal 100 has been accurately mounted in the cradle.

The controller 180 typically controls the overall operation of the mobile terminal 100. For example, the controller 180 may perform control and processing associated with a voice call, data communication, and a video call. The controller 180 may include a multimedia module 181 for multimedia playback. The multimedia module 181 may be implemented within the controller 180 or separately from the controller 180.

Further, the controller 180 may perform a pattern recognition process for enabling a writing input or drawing input performed on the touch screen to be recognized as a text or image.

The power supply 190 may include a plurality of power sources, and may serve to supply power necessary to the operation of each constituent element from any one of the power sources under the control of the controller 180.

For example, the power supply 190 may include first and second power sources 191 and 192, which may include a basic terminal power source (basic terminal battery) 191 and a solar cell 192, respectively. Also, the power supply 190 may utilize the basic terminal power source 191 as a main power source and the solar cell 192 as an auxiliary power source, and vice versa.

The solar cell 192 may be detachably mounted in the mobile terminal 100. As a result, the mobile terminal 100 may charge power using the basic terminal power source 191 or solar cell 192 when the solar cell 192 is attached to the mobile terminal 100, and the basic terminal power source 191 when the solar cell 192 is detached from the mobile terminal 100.

The power supply 190 may also include a storage area (common storage area) for storing powers charged respectively by the first and second power sources 191 and 182 in an integrated manner or storage areas (individual storage areas) for separately storing the powers charged respectively by the first and second power sources 191 and 192.

For example, in the case where the powers are stored in the individual storage areas, the controller 180 may display power icons indicating the levels of the respective remaining power amounts of the first and second power sources 191 and 192 and may separately utilize the respective individual storage areas for the first and second power sources 191 and 192.

Various embodiments described herein may be implemented in a recording medium readable by a computer or its similar devices by employing, for example, software, hardware or some combinations thereof.

For hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electric units designed to perform functions described herein. In some cases, the embodiments described in this specification may be implemented by the controller 180 itself.

For software implementation, embodiments described in this specification, such as procedures and functions, may be implemented by separate software modules, each of which may perform one or more of the functions and operations described herein. Software codes may be implemented by a software application written in any suitable programming language. The software codes may be stored in the memory 160 and executed by the controller 180.

Figure 2A:
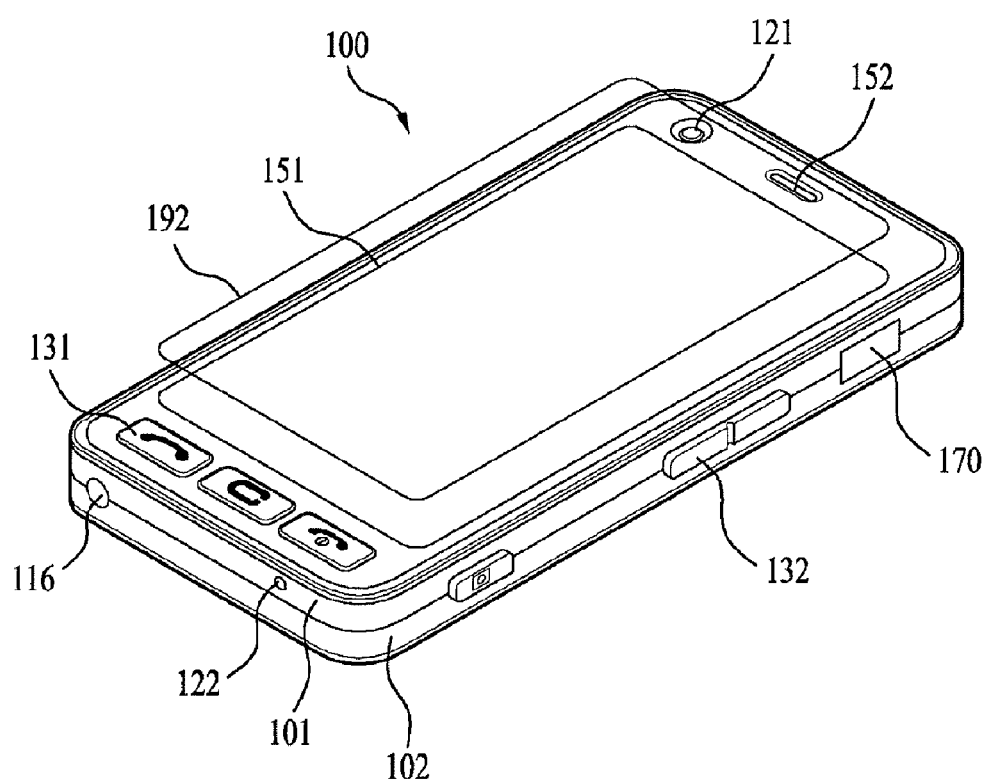
FIG. 2A and FIG. 2B are front and rear perspective views of a mobile terminal according to an embodiment of the invention, respectively.

FIG. 2A is a front perspective view of a mobile terminal according to an embodiment of the invention.

In this embodiment, the mobile terminal 100 has a bar-shaped body. The invention is not limited thereto, but may be applied to a variety of structures in which two or more bodies are coupled in such a way as to be movable relative to each other, such as a slide type, a folder type, a swing type and a swivel type.

The body includes a case (a casing, a housing or a cover) constituting the external appearance of the mobile terminal 100. In the embodiment, the case is divided into a front case 101 and a rear case 102. A variety of electronic components are built in a space formed between the front case 101 and the rear case 102. At least one intermediate case may be additionally disposed between the front case 101 and the rear case 102.

The display unit 151, audio output module 152, camera 121, user input unit 130 (131 and 132), microphone 122 and interface unit 170 may be disposed in the terminal body, mainly, in the front case 101.

The display unit 151 occupies the greater part of a main surface of the front case 101. The audio output module 152 and camera 121 are disposed in an area adjacent to one of both ends of the display unit 151, and the user input unit 131 and microphone 122 are disposed in an area adjacent to the other end. The user input unit 132 and the interface unit 170 may be disposed on side surfaces of the front case 101 and rear case 102.

The user input unit 130 is manipulated to receive commands for control of the operation of the mobile terminal 100 and may include a plurality of manipulating units 131 and 132. The manipulating units 131 and 132 may also be collectively referred to as a 'manipulating portion' and may adopt any kind of method as long as it has a tactile manner that allows the user to manipulate the manipulating units 131 and 132 while feeling a tactile sense.

Also, in the mobile terminal 100, the solar cell 192 may be provided in the front of the display unit 151 provided in the front case 101, so as to constitute a layered structure. The solar cell 192 may be of a transparent type so that readability of information displayed through the display unit 151 can be secured and sunlight can be efficiently incident on the solar cell 192.

Figure 2B:
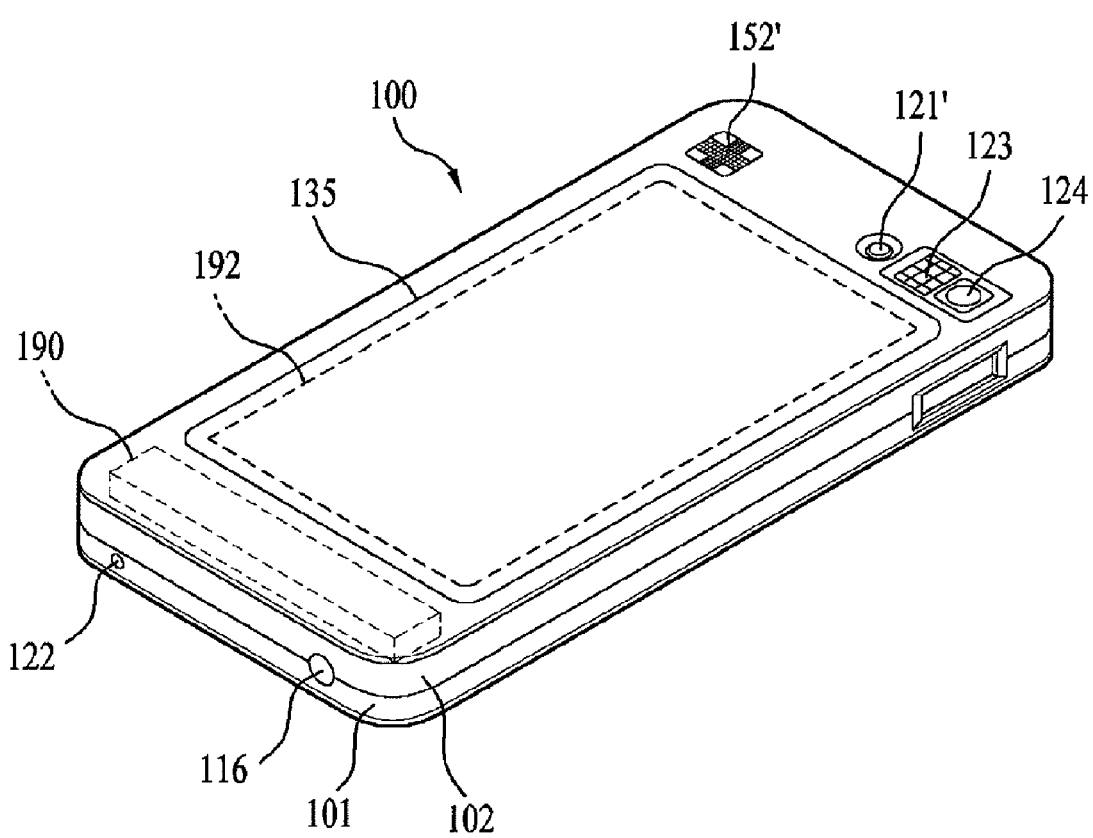

FIG. 2B is a rear perspective view of the mobile terminal shown in FIG. 2A.

Referring to FIG. 2B, an additional camera 121' may be mounted in the rear of the terminal body, or in the rear case 102. The camera 121' may have an image capturing direction substantially opposite to that of the camera 121 (see FIG. 2A) and a different number of pixels from that of the camera 121.

A flash 123 and a mirror 124 may be additionally disposed adjacent to the camera 121'. The flash 123 irradiates light to a subject when the subject is captured by the camera 121', and the mirror 124 enables the user to see his/her face, etc. reflected thereon when intending to capture himself/herself using the camera 121' (self-portrait).

An audio output module 152' may be additionally disposed in the rear of the terminal body. The audio output module 152' may implement a stereo function with the audio output module 152 (see FIG. 2A) and may be used to implement a speakerphone mode during a call.

An antenna 116 for reception of broadcast signals may be further disposed on a side surface of the terminal body in addition to an antenna for calls. The antenna 116, which constitutes a part of the broadcast receiving module 111 (see FIG. 1), may be installed to be extractable from the terminal body.

The power supply 190 is mounted in the terminal body to supply power to the mobile terminal 100. The power supply 190 may be built in the terminal body or detachably mounted outside of the terminal body.

A touch pad 135 may be additionally mounted in the rear case 102 to sense a touch. Furthermore, in the case where a display is additionally mounted to constitute a layered structure with the touch pad 135, a touch screen may also be disposed in the rear case 102.

Also, in the mobile terminal 100, the solar cell 192 may be provided beneath the touch pad 135 in the rear case 102 to constitute a layered structure with the touch pad 135. The touch pad 135 may be of a transparent type so that sunlight can be efficiently incident on the solar cell 192.

The mobile terminal described in this specification is assumed to include at least one of the constituent elements shown in FIG. 1.

Hereinafter, a method for notifying a charging state of a mobile terminal according to embodiments of the invention will be described in detail with reference to the annexed drawings.

For convenience of description, the first power source 191 may be a basic power source and the second power source 192 may be a solar cell. Also, the mobile terminal 100 may include the solar cell 192 mandatorily and the basic power source 191 optionally.

Figure 3:
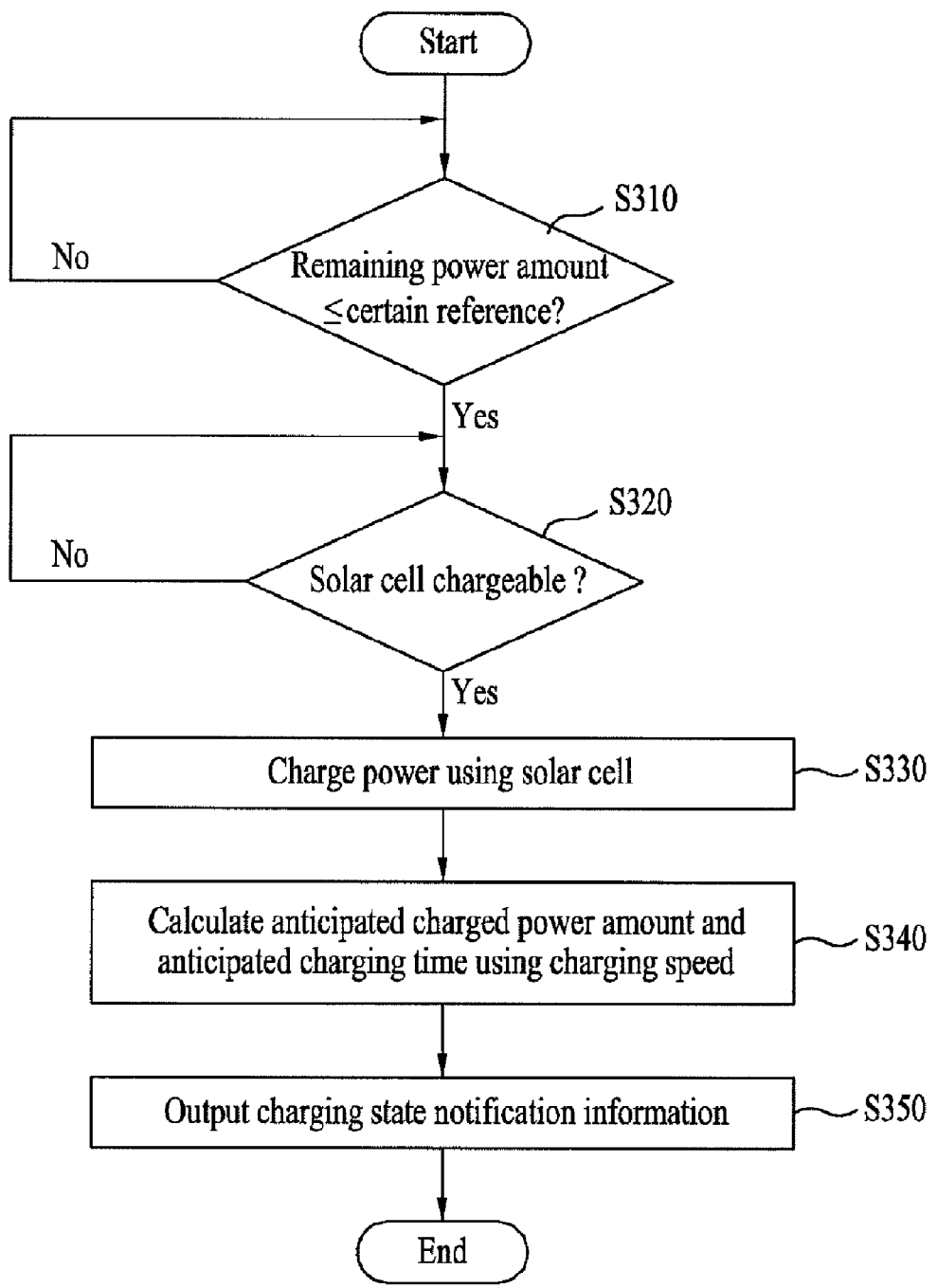
FIG. 3 is a flow chart illustrating a method for notifying a charging state of a mobile terminal according to an embodiment of the invention.

FIG. 3 is a flow chart illustrating a method for notifying a charging state of a mobile terminal according to an embodiment of the invention.

As shown in FIG. 3, the mobile terminal 100 determines under the control of the controller 180 whether the remaining power amount of the power supply 190 is less than or equal to a certain reference (S310).

At the determination step S310, the controller 180 may compare the remaining power amount stored in a common storage area of the power supply 190 or the remaining power amount stored in all individual storage areas of the power supply 190 with a minimum power consumption amount.

The certain reference may be or include a minimum terminal operable power consumption amount. In this embodiment, the minimum terminal operable power consumption amount may signify a power amount required to drive essential modules, for example, the mobile communication module 113 and the controller 180, which relate to a call/message reception operation, which is a basic or principle operation of the mobile terminal 100, for a reference time. Furthermore, the certain reference may relate to a minimum power amount required to keep the mobile terminal 100 in an on state or relate to a minimum power consumption amount required for a call. Also, the controller 180 may determine the remaining power amount of the power supply 190 to be less than or equal to the certain reference when the remaining power amount is not present, is unknown, or when the power supply 190 is in a discharged or discharging state.

The controller 180 may periodically determine whether the remaining power amount is less than or equal to the certain reference. In an embodiment of the invention, the controller 180 may set a period or an interval of performing the determination to be shorter when the level of a remaining power amount of the power supply is smaller.

For example, the controller 180 may set the period or the interval of performing the determination to 30 minutes when the remaining power amount is 30%, 1 hour when the remaining power amount is 50%, and 2 hours when the remaining power amount is 70% compared to a fully charged state of the power supply 190. The fully charged state of the power supply 190 is when the remaining power amount is 100%.

On the other hand, the determination step S310 is not mandatory in embodiments of the invention, and may thus be omitted in some embodiments.

When it is determined at the determination step S310 that the remaining power amount is less than or equal to the certain reference, the mobile terminal 100 determines under the control of the controller 180 whether charging can be performed using only the solar cell 192 (S320).

Alternatively, in the embodiment where the determination step S310 is omitted, the mobile terminal 100 may determine whether the charging can be performed using only the solar cell 192 irrespective of a level of the remaining power amount or irrespective of whether the remaining power amount is less than or equal to the certain reference.

For example, in a state in which the charging of the power supply 190 cannot be performed using other charging means, and given that the solar cell 192 is mounted in the mobile terminal 100, the controller 180 may determine that the charging can be performed using only the solar cell 192 when an intensity of light, such as sunlight or bulb light, is above a certain level or when the solar cell 192 is exposed to the light. Therefore, it may be possible to avoid a situation in which the charging is simultaneously performed with both the basic power source 191 and solar cell 192. In embodiments of Upon determining at the determination step S320 that the charging can be performed using only the solar cell 192, the mobile terminal 100 charges power of the power supply 190 using the solar cell 192 under the control of the controller 180 (S330).

The power charged at the charging step S330 may be stored in the common storage area of the power supply 190 or one of the individual storage areas of the power supply 190 corresponding to the solar cell 192.

The solar cell 192 may include a concentration portion for concentrating the light, and may generate power using the light that is incident on the concentration portion.

Furthermore, in the embodiment where the remaining power amount is less than or equal to the certain reference, the controller 180 may determine that the current state of the mobile terminal 100 is a low power state, and may activate only the modules related to a basic operation of the mobile terminal 100 or other predetermined modules, deactivate the display unit 151 or hold a connection of an incoming call, until, according to the execution of the charging step S330, the remaining power amount exceeds the certain reference and reaches a power amount corresponding to a normal power state (for example, 50% of the remaining power amount of the fully charged state), or at least a minimum operating power state. The reason for the selective activation of the modules or for the hold of the incoming call is to reduce power consumption in the low power state.

Also, the mobile terminal 100 may charge power using only the solar cell 192 even in the discharged state.

The mobile terminal 100 calculates an anticipated charged power amount and an anticipated charging time up to a certain charging state using a power charging speed (hereinafter referred to as a 'charging speed') of the solar cell 192 under the control of the controller 180 (S340).

In this embodiment, the certain charging state may relate to a state in which a certain power amount is charged that is less than the fully charged state (hereinafter referred to as a 'fully charged power amount'), or the remaining power amount of the fully charged state. Such a certain power amount or the remaining power amount may be a a state in which 30%, 50% or 70% of the fully charged power amount is charged in the power supply 190, for example. Other percentages are also possible.

Furthermore, the user input unit 130 may receive an externally inputted signal for setting of the certain charging state, and the controller 180 may set the certain charging state such that it corresponds to the inputted signal. For example, in the embodiment where a user inputs a signal to set the certain charging state to a state in which 50% of the fully charged power amount is charged, the controller 180 may set the state in which 50% of the fully charged power amount is charged as the certain charging state. Therefore, the user may freely select his/her desired charged power amount or desired time it takes to reach the charged power amount as the certain charging state.

In an embodiment of the invention, the charging speed may be calculated using a power amount charged by the solar cell 192 up to the current time and a time it took for the charging of the power amount by the solar cell 192. For example, in the embodiment where the charged power amount up to the current time is SOW and the charging time it took to reach the charged power amount is 1 hour, the controller 180 may calculate the charging speed as 50 [W/H] by dividing the charged power amount, 50 W, by the charging time, 1 hour.

Hereinafter, a process of calculating the anticipated charged power amount and the anticipated charging time will be described on the assumption that the remaining power amount of the fully charged state is 100 W, the charging speed is 20 [W/H] and the charged power amount up to the current time is 40 W, as an example.

The anticipated charged power amount may be 60 W obtained by subtracting the charged power amount up to the current time, 40 W, from the remaining power amount of the fully charged state, 100 W, and the anticipated charging time may be 3 hours obtained by dividing the anticipated charged power amount, 60 W, by the charging speed, 20 [W/H].

Also, the charging speed may change with time, and the mobile terminal 100 may display the changed charging speed to notify the user that the charging speed has changed. Also, the charging time may be set in various time units such as seconds, minutes and hours according to the user's setting.

The mobile terminal 100 outputs charging state notification information including the anticipated charged power amount and anticipated charging time calculated at the calculation step S340 through the output unit 150 under the control of the controller 180 (S350).

The output unit 150 may output the charging state notification information using various notification ways, including a text, image, icon, voice, sound, bell sound, vibration, light emitting element, blinking, fading, etc., for notifying the charging or charged state of the power supply 190.

Also, the output step S350 may be performed randomly or periodically. Alternatively, the output step S350 may be performed when an output request signal is inputted from the user.

In more detail, the output unit 150 may output the charging state notification information using a charging state notification icon including a charging completion region and a charging wait region.

Here, the charging completion region may be a region indicating the level of the power amount charged up to the current time on the basis of the certain charging state, and the charging wait region may be a region indicating the level of the anticipated charged power amount on the basis of the certain charging state.

Alternatively, the output unit 150 may output the charging state notification information using a charging state notification icon having a color, shape, brightness and size, at least one of which is differently set to correspond to the level of at least one of the anticipated charged power amount and anticipated charging time.

Also, the charging state notification information may include a variation in at least one of the anticipated charged power amount and anticipated charging time depending on the power charging by the solar cell 192.

On the other hand, in the embodiment where the power charging is performed using only the solar cell 192 in the discharged state (turn-off state), the mobile terminal 100 may be turned on by the user's selection or may be automatically turned on when the remaining power amount reaches a certain reference, so as to output the charging state notification information. For example, the certain reference may signify the level of a remaining power amount less than the remaining power amount of the certain charging state and may be set by the user. Alternatively, in the embodiment where the power charging is performed using only the solar cell 192 in the discharged state, the mobile terminal 100 may indicate the charging speed or charging level using an external LED(s) even though not turned on. For example, the mobile terminal 100 may change the color of an external LED or adjust the number of activated ones of a plurality of external LEDs, depending on the charging speed or charging level.

A detailed description will hereinafter be given of the output step S350 with reference to FIG. 4A to FIG. 7B. For convenience of description, it will hereinafter be assumed that the certain charging state is the fully charged state.

FIG. 4A to FIG. 4D are screen diagrams illustrating outputs of charging state notification information by charging levels.

Referring to FIG. 4A, the charging levels may be divided from level 1 to level 4, and the anticipated charging time and the anticipated charged power amount may be designated with respect to each level. The number of charging levels need not be four.

For example, steps may be configured in such a manner that the remaining power amount approximates that of the fully charged state as the level increases (level 1→level 4). The level 1 may indicate anticipated charging time 3 hours or anticipated charged power amount 90%, the level 2 may indicate anticipated charging time 2 hours or anticipated charged power amount 60%, the level 3 may indicate anticipated charging time 1 hour or anticipated charged power amount 30%, and the level 4 may indicate the fully charged state (anticipated charging time and anticipated charged power amount 0).

Figure 4B:
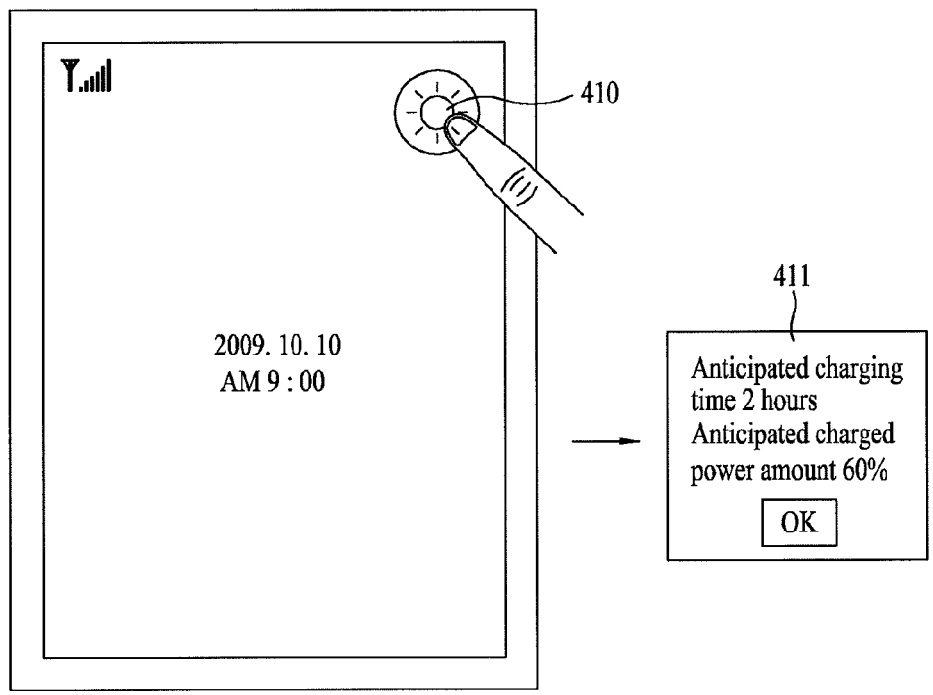
Figure 4B:
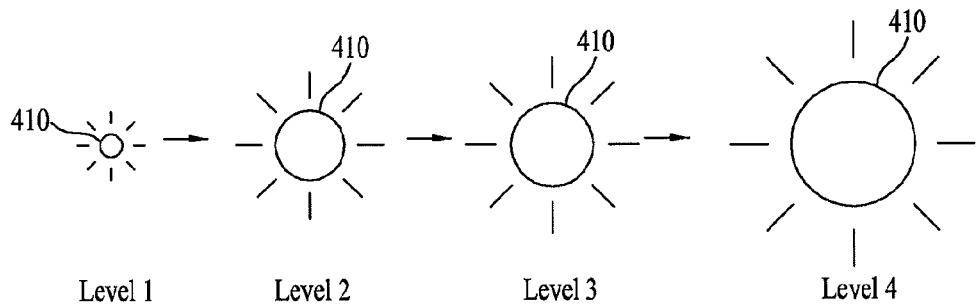

FIG. 4B shows the embodiment where the size of a charging state notification icon enlarges as the charging level increases.

Referring to (a) of FIG. 4B, the mobile terminal 100 may display a charging state notification icon 410 on a portion of the screen. Also, when the charging state notification icon 410 is selected by the user, the mobile terminal 100 may output information about the anticipated charging time and anticipated charged power amount (411). At this time, the output form of the changing state notification icon 140 may be any one of a popup window, overlay and ticker.

Referring to (b) of FIG. 4B, the size of the charging state notification icon 410 gradually enlarge as the charging level progresses from level 1 to level 4. Furthermore, when the charging level progresses from level 1 to level 4, the mobile terminal 100 may increase the brightness of the charging state notification icon 410 or change the color of the charging state notification icon 410, in addition or separately.

On the other hand, irrespective of the charging level, the charging state notification icon 410 may be displayed in such a manner that the size thereof increases in real time as the remaining power amount increases with the charging by the solar cell 192. That is, the increase in the remaining power amount may be reflected in real time in the size of the charging state notification icon 410.

At this time, the memory 160 pre-stores the size, brightness, color, etc., of the charging state notification icon 410 by charging levels.

Figure 4C:
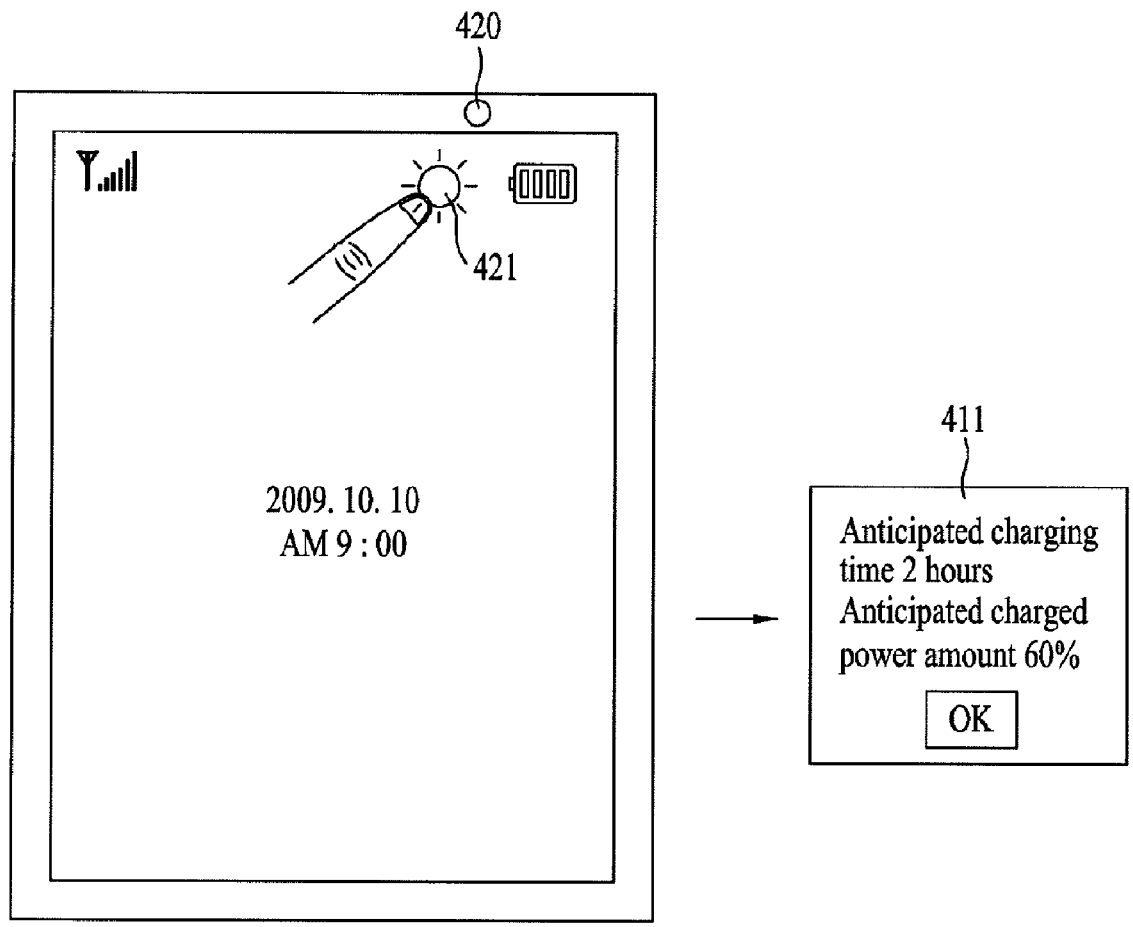

FIG. 4C shows the embodiment where the color of a light emitting element for notifying the charging state is changed as the charging level increases.

Referring to (a) of FIG. 4C, the mobile terminal 100 may include a light emitting element 420 provided at a portion of the terminal, and may indicate the charging level using the color of the light emitting element 420. Also, when a charging state notification icon 421 is selected by the user, the mobile terminal 100 may output information about the anticipated charging time and anticipated charged power amount (411).

Referring to a light emitting element color-by-levels table shown in (b) of FIG. 4C, as the charging level progresses from level 1 to level 4, the color of the light emitting element 420 may be changed in the order of red, orange, green and blue. Other order of the colors, or other colors are possible. Furthermore, as the charging level progresses from level 1 to level 4, the brightness of the light emitting element 420 may be increased correspondingly. Additionally, the charging level progression from level 1 to level 4 may be indicated by a blinking speed, or the speed of fading in and out, of the light emitting element 420. In general, the charging level progression from level 1 to level 4 may be indicated by a change in light emission of the light emitting element 420. Also, the levels of the light emitting element 420 need not be 4.

At this time, the memory 160 pre-stores the color, brightness, etc. of the light emitting element 420 by charging levels.

Figure 4D:
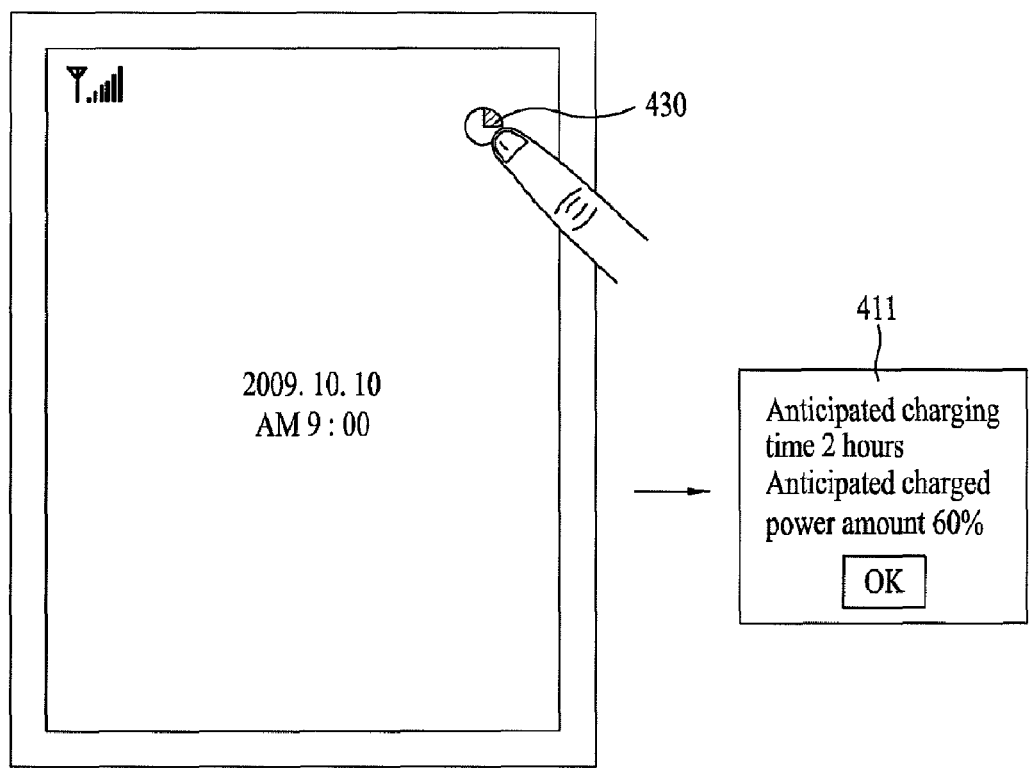
Figure 4D:
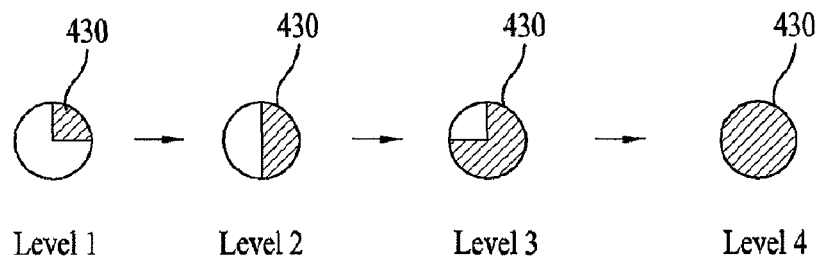

FIG. 4D shows the embodiment where the areas of a charging completion region and charging wait region of a charging state notification icon 430 are changed as the charging level increases.

Referring to (a) of FIG. 4D, the mobile terminal 100 may display a charging state notification icon 430 on a portion of the screen and change the areas of a charging completion region and charging wait region of the charging state notification icon 430 to indicate the charging level. Also, when the charging state notification icon 430 is selected by the user, the mobile terminal 100 may output information about the anticipated charging time and anticipated charged power amount 411.

Referring to (b) of FIG. 4D, as the charging level progresses from level 1 to level 4, the area of the charging completion region of the charging state notification icon 430 may be gradually enlarged and the area of the charging wait region of the charging state notification icon 430 may be gradually reduced correspondingly thereto.

On the other hand, as the remaining power amount increases with the charging by the solar cell 192, irrespective of the charging level, the area of the charging completion region of the charging state notification icon 430 may be gradually enlarged in real time and the area of the charging wait region of the charging state notification icon 430 may be gradually reduced relatively in real time. That is, the increase in the remaining power amount may be reflected in real time in the areas of the charging completion region and charging wait region of the charging state notification icon 430. In addition to being gradually changed as, discussed above, according to the charging or discharging of the power supply 190, the charging state notification icon 430 may change abruptly instead.

At this time, the memory 160 pre-stores the respective areas of the charging completion region and charging wait region by charging levels.

Figure 5A:
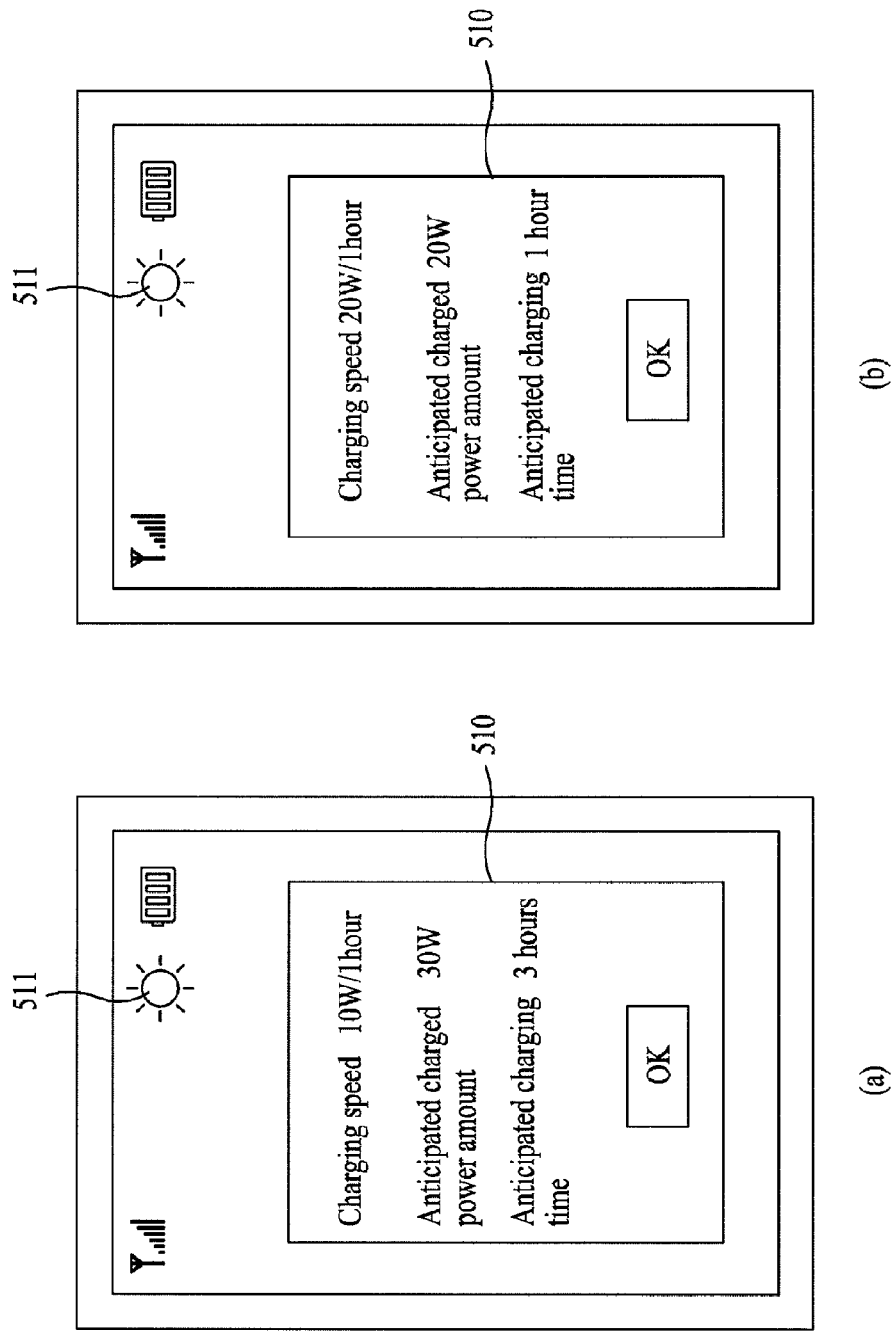

FIG. 5A to FIG. 5C are screen diagrams illustrating outputs of the anticipated charged power amount and anticipated charging time. In particular, FIG. 5A to FIG. 5C show variations in the anticipated charged power amount and anticipated charging time as the remaining power amount increases with the charging by the solar cell 192.

Referring to FIG. 5A, the mobile terminal 100 may output a text including the charging speed, anticipated charged power amount and anticipated charging time in the form of a popup window 510.

For example, in the case where, at 9 AM, the charging speed is 10 [W/H] and the anticipated charged power amount is 30 W, the anticipated charging time may be 3 hours and the anticipated charging expiration time may be 12 PM. Thereafter, in the case where, at 10 AM after one hour elapses, the charging speed is 20 [W/H] and the anticipated charged power amount is 20 W, the anticipated charging time may be 1 hour and the anticipated charging expiration time may be 11 AM.

Referring to FIG. 5B, the mobile terminal 100 may indicate the anticipated charged power amount and anticipated charging time indicated in the text in FIG. 5A using a progressive bar 521.

For example, the progressive bar 521 may include a first region 521-1, which is a charging completion region, and a second region 521-2, which is a charging wait region. It can be seen that, with the increase in the remaining power amount, the first region 521-1 is increased in area and the second region 521-2 is reduced in area.

Referring to FIG. 5C, the mobile terminal 100 may output the anticipated charging expiration time calculated using the charging speed, anticipated charged power amount and anticipated charging time in the form of a popup window 530 in a manner similar to the description relating to FIG. 5A.

Figure 6A:
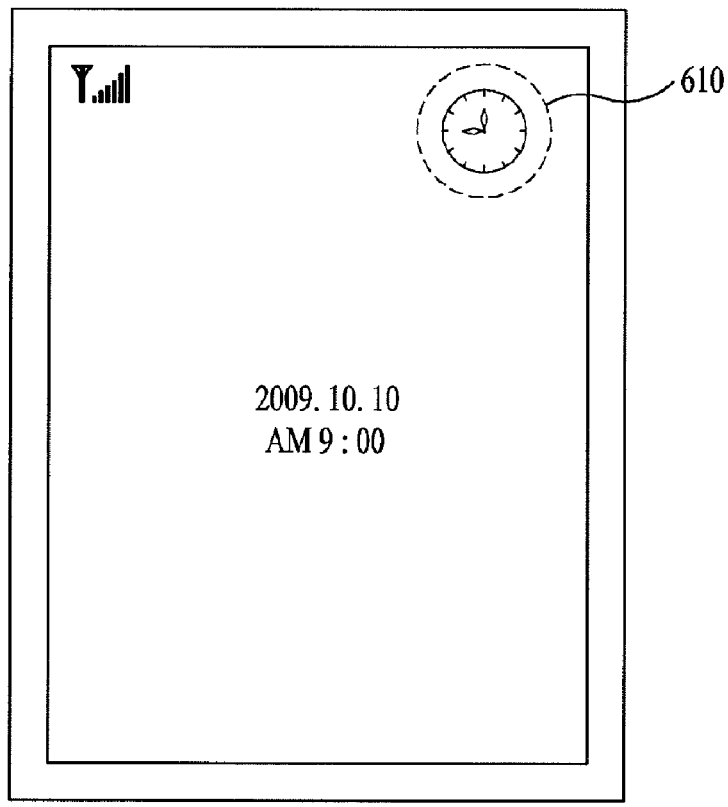
FIG. 6A and FIG. 6B are screen diagrams illustrating the display of charging state notification icons reflecting realtime variations in the anticipated charged power amount and anticipated charging time according to the invention.
Figure 6A:
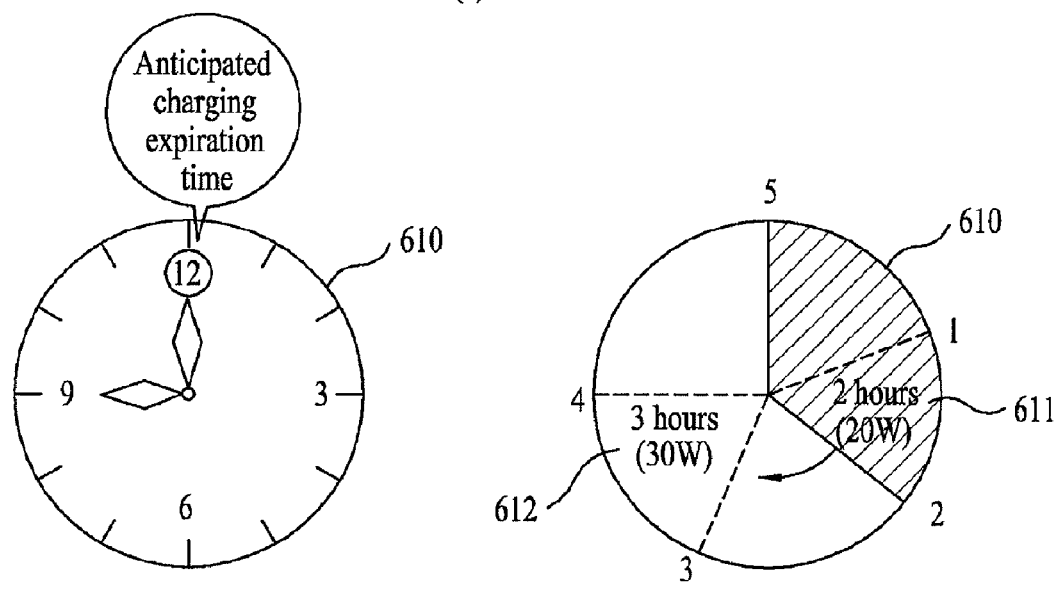
Figure 6B:
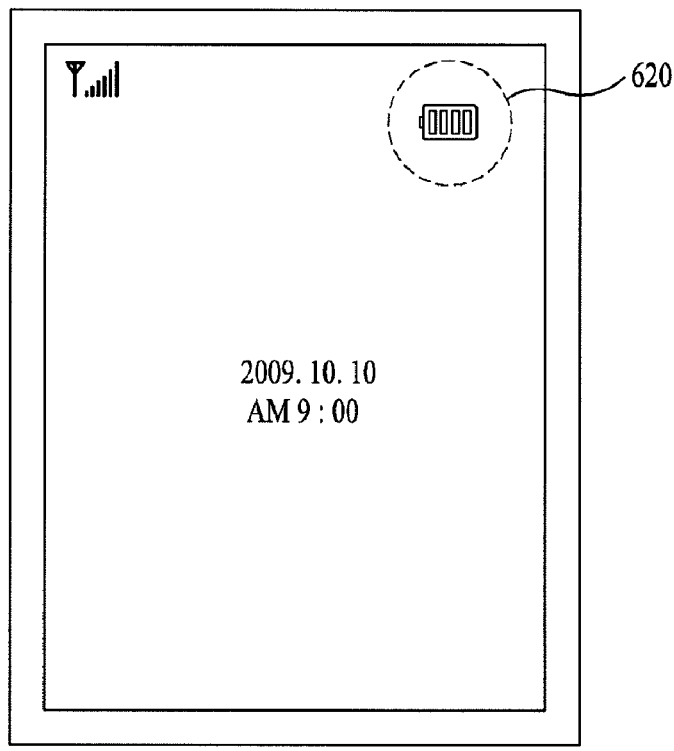
Figure 6B:
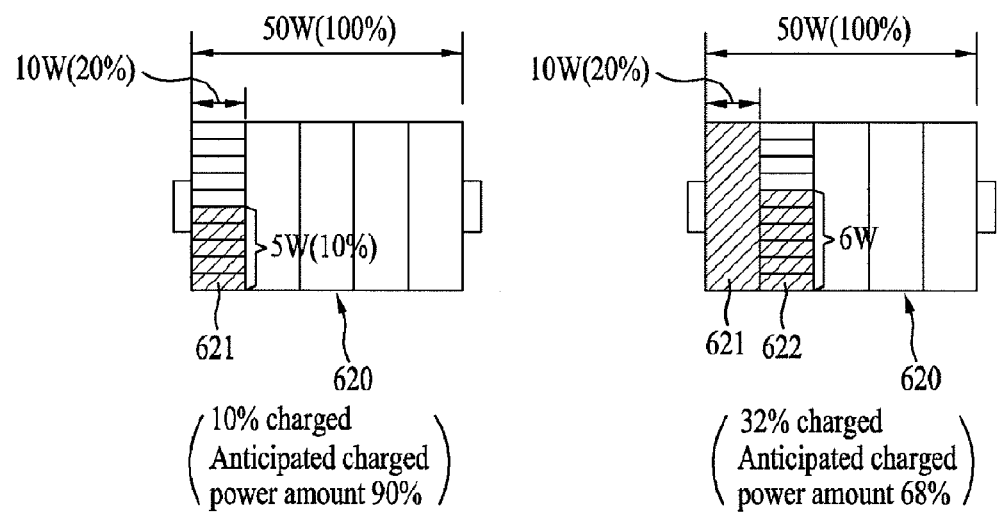

FIG. 6A and FIG. 6B are screen diagrams illustrating the display of charging state notification icons reflecting real-time variations in the anticipated charged power amount and anticipated charging time.

Referring to (a) of FIG. 6A, the mobile terminal 100 may display a clock-shaped charging state notification icon 610 that is shown on a portion of the screen.

Referring to (b) of FIG. 6A, the charging state notification icon 610 may be a clock icon indicating the current time, which may have a graphic indication (the circle containing the digit 12) that indicates the anticipated charging expiration time of twelve o'clock when the current time is 9 AM, and anticipated charging time is 3 hours. On the other hand, if the anticipated charging time is 1 hour, when the current time is 10 AM, the charging state notification icon 610 would indicate the anticipated charging expiration time as being eleven o'clock.

Referring to (b) of FIG. 6A, the charging state notification icon 610 may include a first region 611 indicating a charging progress time up to the current time (for example, representing a current charged amount of the power supply 190), and a second region 612 indicating the anticipated charging time (for example, representing an amount needed to be charged to obtain a full charge of the power supply 190).

For example, when the charging progress time is 2 hours and the anticipated charging time is 3 hours, the areas of the first and second regions 611 and 612 may be ⅖ and ⅗ of the gross area of the charging state notification icon 610, respectively, if given that a full charging time of the power supply 190 is 5 hours. On the other hand, if the anticipated charging time is 1 hour, the areas of the first and second regions 611 and 612 may be ¾ and ¼ of the gross area of the charging state notification icon 610, respectively.

Referring to (a) of FIG. 6B, the mobile terminal 100 may indicate an increase in the remaining power amount of the power supply 190 due to the power charging by the solar cell 192 using a power indicator 620 indicative of the level of the remaining power amount. Accordingly, the power indicator 620 is another example of a charging state notification icon.

In this embodiment of the invention, the power indicator 620 may be displayed on a background screen of the mobile terminal 100. Also, the power indicator 620 may be divided into five regions (first to fifth regions), one or more of which may be displayed in black (filled or otherwise indicated) sequentially from the first region to the fifth region depending on the level of the remaining power amount of the power supply 190. The number of regions of the power indicator 620 need not be five.

Referring to (b) of FIG. 6B, in consideration of the fact that the charging by the solar cell 192 is generally slower than USB charging or AC power charging, each of the first to fifth regions of the power indicator 620 may be further subdivided, for example, into ten sub-regions, which may be displayed in black (filled or otherwise indicated) in the order of the first region to the fifth region depending on the level of the remaining power amount.

For example, assuming that the remaining power amount of the fully charged state of the power supply 190 is 50 W (100%), each of the five regions may then indicate an amount of power that is 10 W (20%) and each of the sub-regions may indicate an amount of power that is 1 W (2%). In the power indicator 620, five of the sub-regions of the first region, denoted by reference numeral 621, may be processed in black (filled or otherwise indicated) to indicate that the current remaining power amount is 5 W (10%). Also, with the increase in the remaining power amount by charging of power, all the sub-regions of the first region 621 and six of the sub-regions of the second region, denoted by reference numeral 622, may be processed in black (filled or otherwise indicated) to indicate that the current remaining power amount is 16 W (32%). In embodiments of the invention, the fully charged state, the regions and the sub-regions of the power supply 190 need not be fixed at 50 W, 10 W and 2 W, respectively. Also, the representation of the fully charged state, the regions and the sub-regions of the power supply 190 need not be rectangular bars as shown, but may be groupings of circles, polygons, or other shapes. Also, the basis of the division of the regions, and the sub-regions need not be power (i.e., watts (w)), and may instead be power amounts needed for one or more calls, one or more texts, one or more downloads, one or more searches, a predetermined amount of standby time, or any other amount of power needed for a function of the mobile terminal 190 or its constituent modules.

Figure 7A:
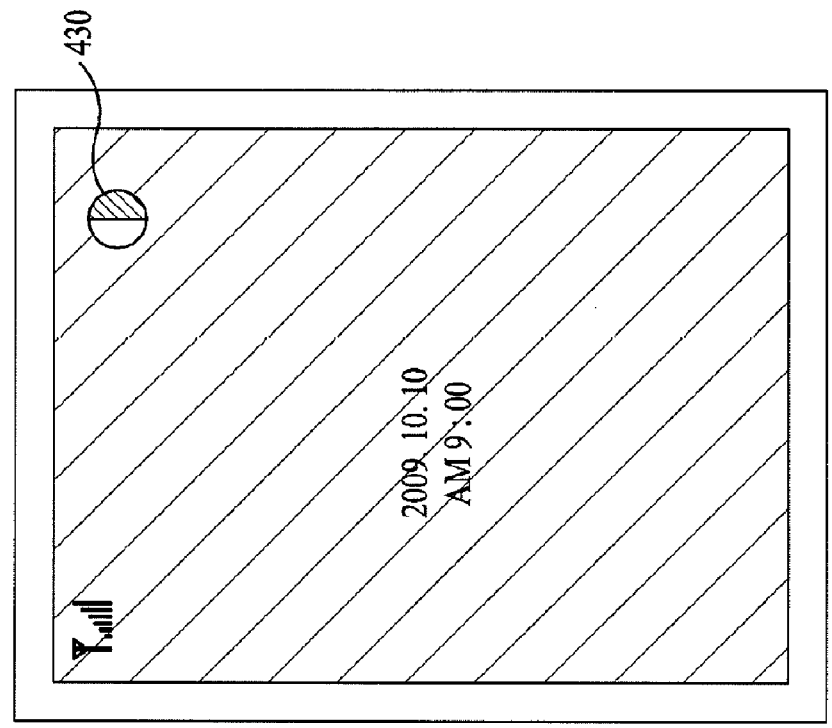
Figure 7A:
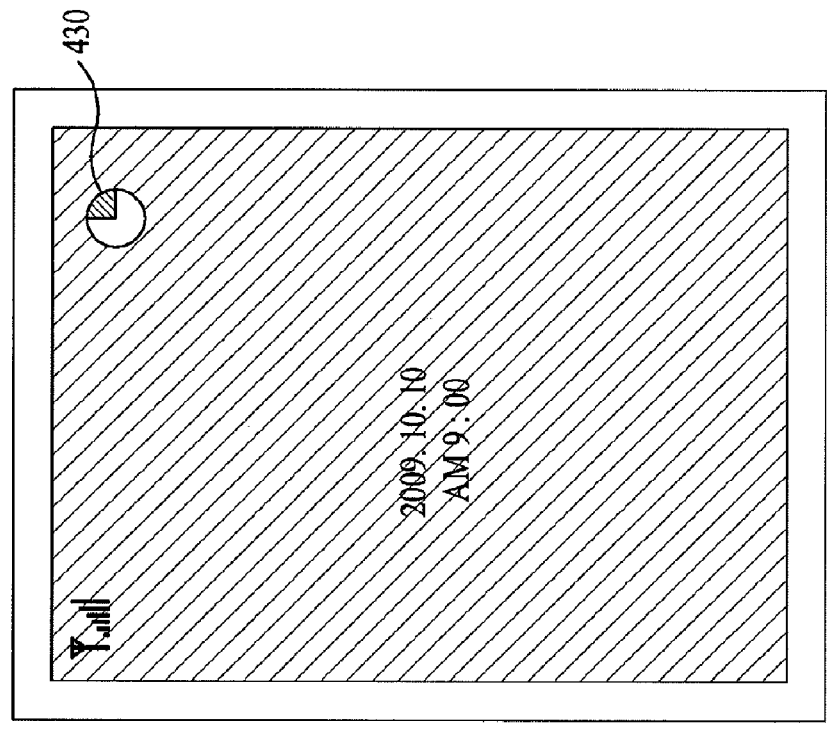

FIG. 7A and FIG. 7B are screen diagrams illustrating the control of the operation of the display unit based on the anticipated charged power amount and anticipated charging time.

Referring to FIG. 7A, the mobile terminal 100 may gradually increase a brightness of the display unit as the remaining power amount increases, or the anticipated charged power amount decreases, with the power charging by the solar cell 192. In other words, the brightness of the display unit may be changed depending on the amount of remaining power. Accordingly, the brightness of the display unit during normal use may be greater when the amount of remaining power is greater than when the amount of remaining power is lower.

Alternatively, referring to FIG. 7B, the mobile terminal 100 may increase an amount of information to be displayed through the display unit as the remaining power amount increases with the power charging by the solar cell 192. In other words, the amount of information that is displayed on a display unit may be changed depending on the amount of remaining power. Accordingly, the amount of information that is displayed on the display unit during normal use may be greater when the amount of remaining power is greater than when the amount of remaining power is lower.

For example, in a wait state (or a standby state when the mobile terminal is not being used for a call or texting, for example), the mobile terminal 100 may display time information when the remaining power amount is 30% (or the anticipated charged power amount is 70%) as shown in (a) of FIG. 7B, a background image and time information when the remaining power amount is 50% (or the anticipated charged power amount is 50%) as shown in (b) of FIG. 7B, and a background image, time information, and menu icons 701 when the remaining power amount is more than 70% (or the anticipated charged power amount is less than 30%) as shown in (c) of FIG. 7B.

The above-stated embodiments related to the invention may also be applied to a general charging operation using the basic power source 191.

According to an embodiment of the invention, the method for notifying the charging state of the mobile terminal may be implemented in a program-recorded medium by processor-readable codes. The processor-readable medium may include, for example, a ROM, a RAM, a CD-ROM, a magnetic tape, a floppy disk, an optical data storage, or the like. The processor-readable medium may also be implemented in the form of a carrier wave (for example, transmission over the Internet).

As apparent from the above description, a mobile terminal and a method for notifying a charging state thereof according to at least one of the embodiments of the invention, configured as stated above, provide effects as follows.

Firstly, when power charging is performed using only a solar cell, it is possible to provide information about an anticipated charged power amount and an anticipated charging time up to a certain charging state.

Secondly, when the power charging is performed using only the solar cell, it is possible to indicate in real time variations in the anticipated charged power amount and anticipated charging time.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A mobile terminal, comprising:
a power supply including a solar cell;
a controller which determines whether charging of power to the power supply can be performed using only the solar cell, controls charging of the power to the power supply using the solar cell when it is determined that the charging of the power can be performed using only the solar cell, and calculates an anticipated charged power amount and an anticipated charging time to reach a certain charging state of the power supply using a power charging speed of the solar cell; and
an output unit which outputs charging state notification information that indicates at least one of the calculated anticipated charged power amount and the anticipated charging time, under control of the controller,
wherein the controller further calculates the power charging speed of the solar cell using a charged power amount and a charging time taken by the solar cell to charge the charged power amount.

2. The mobile terminal according to claim 1, wherein the controller further determines whether the charging of the power can be performed using only the solar cell, when a remaining power amount of the power supply is less than or equal to a certain reference.

3. The mobile terminal according to claim 1, further comprising a memory which stores a plurality of charging levels for at least one of the anticipated charged power amount and the anticipated charging time,
wherein the output unit outputs, under the control of the controller, the charging state notification information such that the charging state notification information corresponds to one of the plurality of charging levels corresponding to at least one of the calculated anticipated charged power amount and the anticipated charging time.

4. The mobile terminal according to claim 1, wherein the charging state notification information includes a real-time variation in at least one of the anticipated charged power amount and the anticipated charging time, depending on the charging power of the solar cell.

5. The mobile terminal according to claim 1, wherein the output unit outputs, under the control of the controller, the charging state notification information using a charging state notification icon that includes a charging completion region and a charging wait region.

6. The mobile terminal according to claim 1, wherein the output unit outputs, under the control of the controller, the charging state notification information using a charging state notification icon having a color, shape, brightness and size, at least one of which is differently set to correspond to a level of at least one of the anticipated charged power amount and the anticipated charging time.

7. The mobile terminal according to claim 1, further comprising a user input unit which receives an input signal for setting the certain charging state of the power supply,
wherein the controller sets the certain charging state that corresponds to the input signal.

8. A method for notifying a charging state of a mobile terminal, the method comprising:
determining whether charging of power to a power supply can be performed using only a solar cell;
charging the power to the power supply using the solar cell when it is determined that the charging of the power can be performed using only the solar cell;

calculating an anticipated charged power amount and an anticipated charging time to reach a certain charging state of the power supply using a power charging speed of the solar cell; and outputting charging state notification information that indicates at least one of the calculated anticipated charged power amount and the anticipated charging time, wherein the power charging speed of the solar cell is calculated using a charged power amount and a charging time taken by the solar cell to charge the charged power amount.

9. The method according to claim 8, wherein the step of outputting includes outputting a real-time variation in at least one of the anticipated charged power amount and the anticipated charging time depending on the charging power of the solar cell.

10. The method according to claim 8, wherein the step of outputting includes outputting the charging state notification information using a charging state notification icon having a color, shape, brightness and size, at least one of which is differently set to correspond to a level of at least one of the anticipated charged power amount and the anticipated charging time.

11. The method according to claim 8, wherein the step of determining is performed when a remaining power amount of the power supply is less than or equal to a certain reference.

12. A mobile terminal, comprising:
a power supply including a solar cell;
a controller which determines whether charging of the power supply can be performed to a certain charging state that is less than a full charging of the power supply using only the solar cell, controls charging of the power to the power supply using the solar cell when it is determined that the charging of the power can be performed using only the solar cell, and calculates an anticipated charged power amount and an anticipated charging time to reach the certain charging state of the power supply using a power charging speed of the solar cell; and an output unit which outputs charging state notification information that indicates at least one of the calculated anticipated charged power amount and the anticipated charging time, under control of the controller, wherein the controller further calculates the power charging speed of the solar cell using a charged power amount and a charging time taken by the solar cell to charge the charged power amount.

13. The mobile terminal according to claim 12, wherein the output unit outputs, under the control of the controller, the charging state notification information using a charging state notification icon having a color, shape, brightness and size, at least one of which is differently set to correspond to a level of at least one of the anticipated charged power amount and the anticipated charging time.

14. The mobile terminal according to claim 12, wherein the output unit outputs, under the control of the controller, the charging state notification information using text and numbers.

15. The mobile terminal according to claim 12, further comprising a display unit,
wherein the output unit outputs, under the control of the controller, the charging state notification information by changing a brightness of the display unit depending on at least one of the calculated anticipated charged power amount and the anticipated charging time.

* * * * *